United States Patent
Siddhant et al.

(10) Patent No.: US 11,736,893 B2
(45) Date of Patent: Aug. 22, 2023

(54) NOTCH FILTER CODEPHASE IMPACT MITIGATION

(71) Applicant: QUALCOMM Incorporated, San Diego, CA (US)

(72) Inventors: Siddhant, Hyderabad (IN); Mukesh Kumar, Dinanagar (IN); Jordan Cookman, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 206 days.

(21) Appl. No.: 17/473,877

(22) Filed: Sep. 13, 2021

(65) Prior Publication Data
US 2022/0240048 A1     Jul. 28, 2022

Related U.S. Application Data

(60) Provisional application No. 63/141,056, filed on Jan. 25, 2021.

(51) Int. Cl.
*H04W 24/00*     (2009.01)
*H04W 4/02*      (2018.01)
*H04W 4/029*     (2018.01)
*H04B 7/185*     (2006.01)

(52) U.S. Cl.
CPC ........ *H04W 4/023* (2013.01); *H04B 7/18513* (2013.01); *H04W 4/029* (2018.02)

(58) Field of Classification Search
CPC ..... H04W 4/023; H04W 4/09; H04B 7/18513
See application file for complete search history.

(56) References Cited

U.S. PATENT DOCUMENTS

| | | | |
|---|---|---|---|
| 9,008,249 B2 | 4/2015 | Wu et al. | |
| 2012/0105284 A1 | 5/2012 | Anandakumar et al. | |
| 2013/0208838 A1* | 8/2013 | Wu | H04B 1/1036 |
| | | | 375/350 |
| 2022/0137236 A1* | 5/2022 | Conflitti | G01S 19/30 |
| | | | 342/357.25 |

FOREIGN PATENT DOCUMENTS

| | | |
|---|---|---|
| WO | 2012157142 A1 | 11/2012 |
| WO | 2013119421 A1 | 8/2013 |

OTHER PUBLICATIONS

International Search Report and Written Opinion—PCT/US2021/060432—ISA/EPO—dated Jun. 9, 2022.

* cited by examiner

*Primary Examiner* — Erika A Washington
(74) *Attorney, Agent, or Firm* — Thien T. Nguyen

(57) ABSTRACT

Techniques are provided for utilizing notch filters to overcome narrowband jamming. An example method for determining a range to a satellite vehicle with a receiver includes receiving a signal from the satellite vehicle, determining one or more notch filter configurations, determining a pseudorandom noise code and a doppler frequency associated with the signal, determining a codephase correction value based at least on the one or more notch filter configurations, the pseudorandom noise code and the doppler frequency, and computing the range to the satellite vehicle based at least in part on the signal and the codephase correction value.

40 Claims, 16 Drawing Sheets

NOTCH FILTER CODEPHASE IMPACT MITIGATION

CROSS-REFERENCE TO RELATED APPLICATION

This application claims the benefit of U.S. Provisional Application No. 63/141,056, filed on Jan. 25, 2021, and entitled "NOTCH FILTER CODEPHASE IMPACT MITIGATION," which is assigned to assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points.

Many UEs include a Global Navigation Satellite System (GNSS) receiver and may determine a position by precisely measuring the arrival time of signaling events received from multiple satellites. The Satellite Vehicles (SVs) in a GNSS system typically transmit data using a form of spread spectrum coding. For example, the Global Positioning System (GPS) utilizes code division multiple access (COMA). Each SV is assigned a coarse acquisition (CA) code which resembles pseudo random noise and is unique to the that SV. Each SV encodes data using the SV's own CA code and transmits encoded data on a carrier frequency. Thus, may SVs may be simultaneously transmitting data on the shared carrier frequency. Each CA code consists of a sequence of 1023 "chips" where each chip is assigned a value of one or zero. The CA code is transmitted at a rate of 1.023 MHz, therefore, each chip period is approximately 0.977 us. Each SV continually transmits a repeating pattern consisting of the SV's own CA code. The GPS SV may encode navigational or system data by inverting the transmitted CA code. CA code phase is the relationship of a CA code either to a reference clock or to other CA codes transmitted by other SVs. Although the CA code phase may be synchronized between SVs at the time of transmission, the CA codes may be received with differing delays at the GPS receiver due to different propagation times. Typically, a GPS receiver determines which CA codes are being received in order to determine which GPS satellites are in view.

There are many impediments to receiving signals from GPS satellites. In particular, UEs which are also configured to utilize other wireless technologies such as Wi-Fi, BLUETOOTH, and other cellular based technologies, may generate signals which interfere with the spread spectrum used by a GNSS receiver. For example, harmonics or other artifacts of oscillators within a UE may cause localized jamming of one or more regions within the radio frequency spectrum utilized by the GNSS receiver. Notch filtering within the GNSS receiver may be used to reduce the impact of such jamming signals.

SUMMARY

An example method for determining a range to a satellite vehicle with a receiver according to the disclosure includes receiving a signal from the satellite vehicle, determining one or more notch filter configurations, determining a pseudorandom noise code and a doppler frequency associated with the signal, determining a codephase correction value based at least on the one or more notch filter configurations, the pseudorandom noise code and the doppler frequency, and computing the range to the satellite vehicle based at least in part on the signal and the codephase correction value.

Implementations of such a method may include one or more of the following features. Determining the codephase correction value may include obtaining the codephase correction value from a look-up-table based on the one or more notch filter configurations, the pseudorandom noise code and the doppler frequency. Assistance data may be received from a network entity, wherein the assistance data includes the look-up-table. The assistance data may be received via one or more Long Term Evolution Positioning Protocol (LPP) messages. The assistance data may be received via one or more Radio Resource Control (RRC) messages. Determining the codephase correction value may include obtaining the codephase correction value based on an interpolation function. A look-up-table may be generated by the receiver based on modeled auto-correlation functions for a plurality of notch filter configurations, and wherein determining the codephase correction value includes obtaining the codephase correction value from the look-up-table based on the one or more notch filter configurations, the pseudorandom noise code and the doppler frequency. The one or more notch filter configurations may include one or more notch frequencies and one or more bandwidths associated with the one or more notch frequencies. Computing the range to the satellite vehicle may include determining a pseudorange to the satellite vehicle based on the signal. The receiver may include one or more notch filters comprised of one or more digital filters with programmable center frequencies and bandwidths.

An example apparatus according to the disclosure includes a memory, at least one satellite positioning system receiver configured to receive a signal from a satellite vehicle, at least one processor communicatively coupled to the memory and the at least one satellite positioning system receiver and configured to receive the signal from the satellite vehicle, determine one or more notch filter configurations, determine a pseudorandom noise code and a doppler frequency associated with the signal, determine a codephase correction value based at least on the one or more notch filter configurations, the pseudorandom noise code and the doppler frequency, and compute a range to the satellite vehicle based at least in part on the signal and the codephase correction value.

Implementations of such an apparatus may include one or more of the following features. The at least one processor may be further configured to obtain the codephase correction value from a look-up-table based on the one or more notch filter configurations, the pseudorandom noise code and the doppler frequency. The apparatus may include at least one transceiver communicatively coupled to the at least one processor, such that the at least one processor is further configured to receive assistance data from a network entity, and wherein the assistance data includes the look-up-table. The assistance data may be received via one or more Long Term Evolution Positioning Protocol (LPP) messages. The assistance data may be received via one or more Radio Resource Control (RRC) messages. The at least one processor may be further configured to obtain the codephase correction value based on an interpolation function. The at least one processor may be further configured to generate a look-up-table based on modeled auto-correlation functions for a plurality of notch filter configurations, and obtain the codephase correction value from the look-up-table based on the one or more notch filter configurations, the pseudorandom noise code and the doppler frequency. The one or more notch filter configurations may include one or more notch frequencies and one or more bandwidths associated with the one or more notch frequencies. The at least one processor may be further configured to determine a pseudorange to the satellite vehicle based on the signal. The one or more notch filter configurations may comprise one or more digital filters with programmable center frequencies and bandwidths.

An example apparatus for determining a range to a satellite vehicle according to the disclosure includes means for receiving a signal from the satellite vehicle, means for determining one or more notch filter configurations, means for determining a pseudorandom noise code and a doppler frequency associated with the signal, means for determining a codephase correction value based at least on the one or more notch filter configurations, the pseudorandom noise code and the doppler frequency, and means for computing the range to the satellite vehicle based at least in part on the signal and the codephase correction value.

An example non-transitory processor-readable storage medium comprising processor-readable instructions to cause one or more processors to determine a range to a satellite vehicle according to the disclosure includes code for receiving a signal from the satellite vehicle, code for determining one or more notch filter configurations, code for determining a pseudorandom noise code and a doppler frequency associated with the signal, code for determining a codephase correction value based at least on the one or more notch filter configurations, the pseudorandom noise code and the doppler frequency, and code for computing the range to the satellite vehicle based at least in part on the signal and the codephase correction value.

Items and/or techniques described herein may provide one or more of the following capabilities, as well as other capabilities not mentioned. A GNSS receiver may receive a signal from a satellite vehicle in a radio frequency spectrum. Reception within one or more frequencies in the spectrum may be degraded due to local jammers. Notch filters may be used to mitigate the impact of jamming. The accuracy of codephase measurements may be reduced due to the use of the notch filters. The impact on the codephase measurements is dependent on the pseudorandom noise code of the received signal, the satellite vehicle doppler frequency and the notch configuration. Look-up-tables may be generated to select a codephase correction value based on the pseudorandom noise code of the received signal, the satellite vehicle doppler frequency and the notch configuration. The look-up-tables maybe generated locally on the GNSS receiver, and/or received as assistance data from a network. The codephase correction values may be used to improve range computations. The accuracy of GNSS position estimates may be improved. Other capabilities may be provided and not every implementation according to the disclosure must provide any, let alone all, of the capabilities discussed.

DETAILED DESCRIPTION

Techniques are discussed herein for utilizing notch filters to overcome narrowband jamming. A notch filter is defined as any receiver element or process that attenuates or removes a portion of the received signal. For example, a programmable filter may be utilized to attenuate a portion of the received spectrum around a programmed narrowband jammer frequency. Alternately, an adaptive filter may be utilized that automatically updates its frequency response to attenuate the received spectrum around any narrowband jammers that dynamically appear. Alternately, an interference canceler may be utilized, wherein the narrowband jammer signal is estimated and subtracted from the received signal. Filtering or interference cancellation may be implemented by analog or digital means, or any combination thereof. A digital front end (DFE) in a GNSS receiver may utilize notch filters to mitigate the impact of narrowband jamming, such as caused by primary and/or harmonics signals generated by other oscillators in a mobile device. In operation, the notch filters may impact the codephase measurements obtained by the GNSS receiver and thus may also impact the accuracy of the position estimates that are based on the measurements. The distortion in the codephase measurements may be based on several factors such as the number and bandwidths of the notch filters, the pseudorandom noise (PRN) code of the transmitting SV, and the notch frequency relative to the SV doppler frequency. In an example, the techniques provided herein utilize one or more look-up-tables (LUTs) to determine codephase error values based on a PRN code, notch frequencies, notch bandwidths and the SV doppler frequency. The LUT may be provided to a UE via a communication network (e.g., as range assistance data) and/or other device-to-device communication links. In another example, the codephase error values may be generated online (i.e., locally on a UE) based on the PRN code, notch frequencies, notch bandwidths and the SV doppler frequency. The online generation of the codephase errors may enable mitigation for dynamic notch filtering. These techniques and configurations are examples, and other techniques and configurations may be used.

Figure 1:
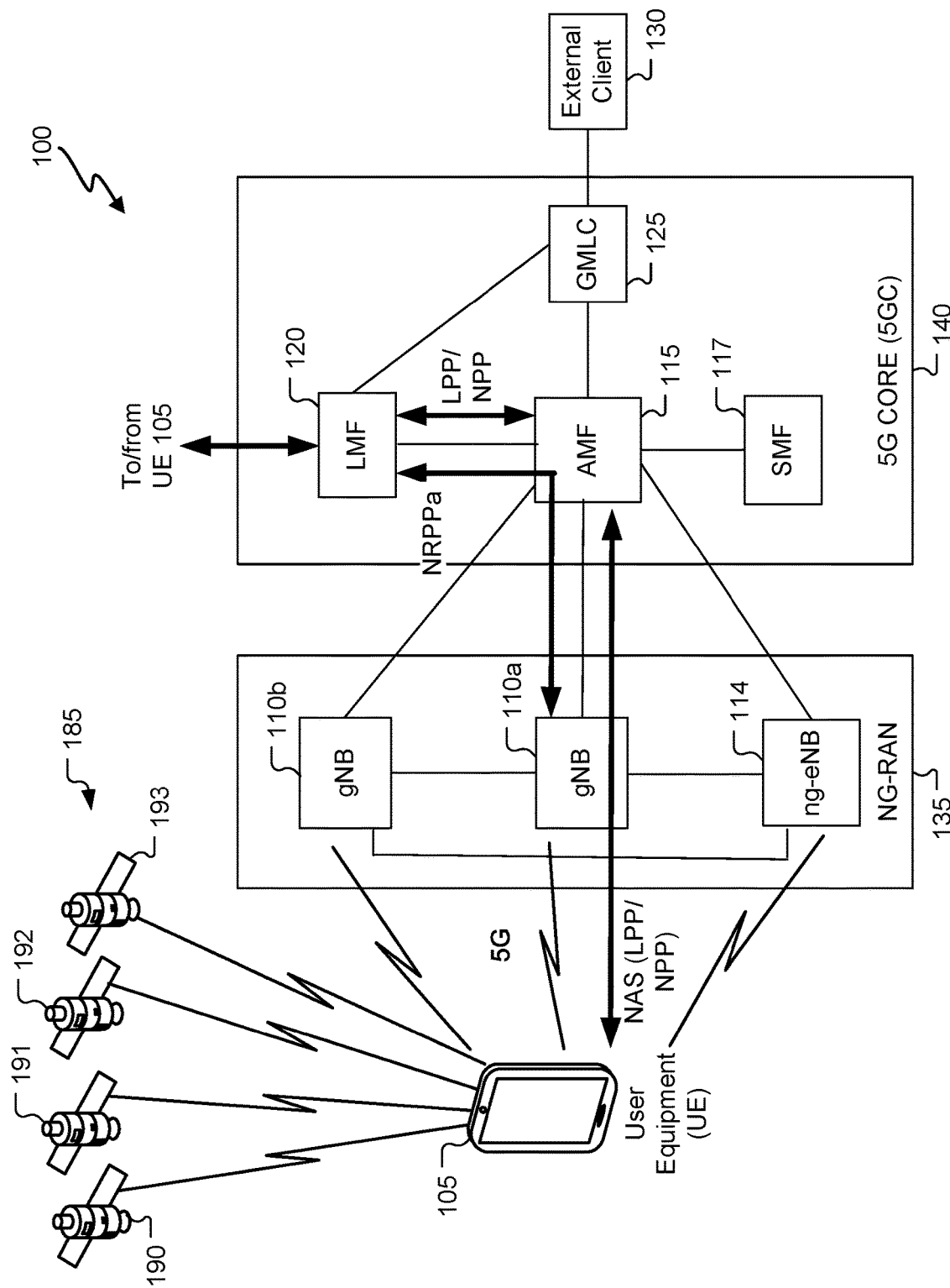
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or movable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

Base stations, such as the gNB 110a, gNB 110b, and the ng-eNB 114, may each comprise one or more TRPs. For example, each sector within a cell of a BS may comprise a TRP, although multiple TRPs may share one or more components (e.g., share a processor but have separate antennas). The system 100 may include macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114.

With a UE-assisted position method, the UE 105 may obtain location measurements and send the measurements to a network entity such as a base station or location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a network entity such as location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a network entity such as location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from a network entity such as the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
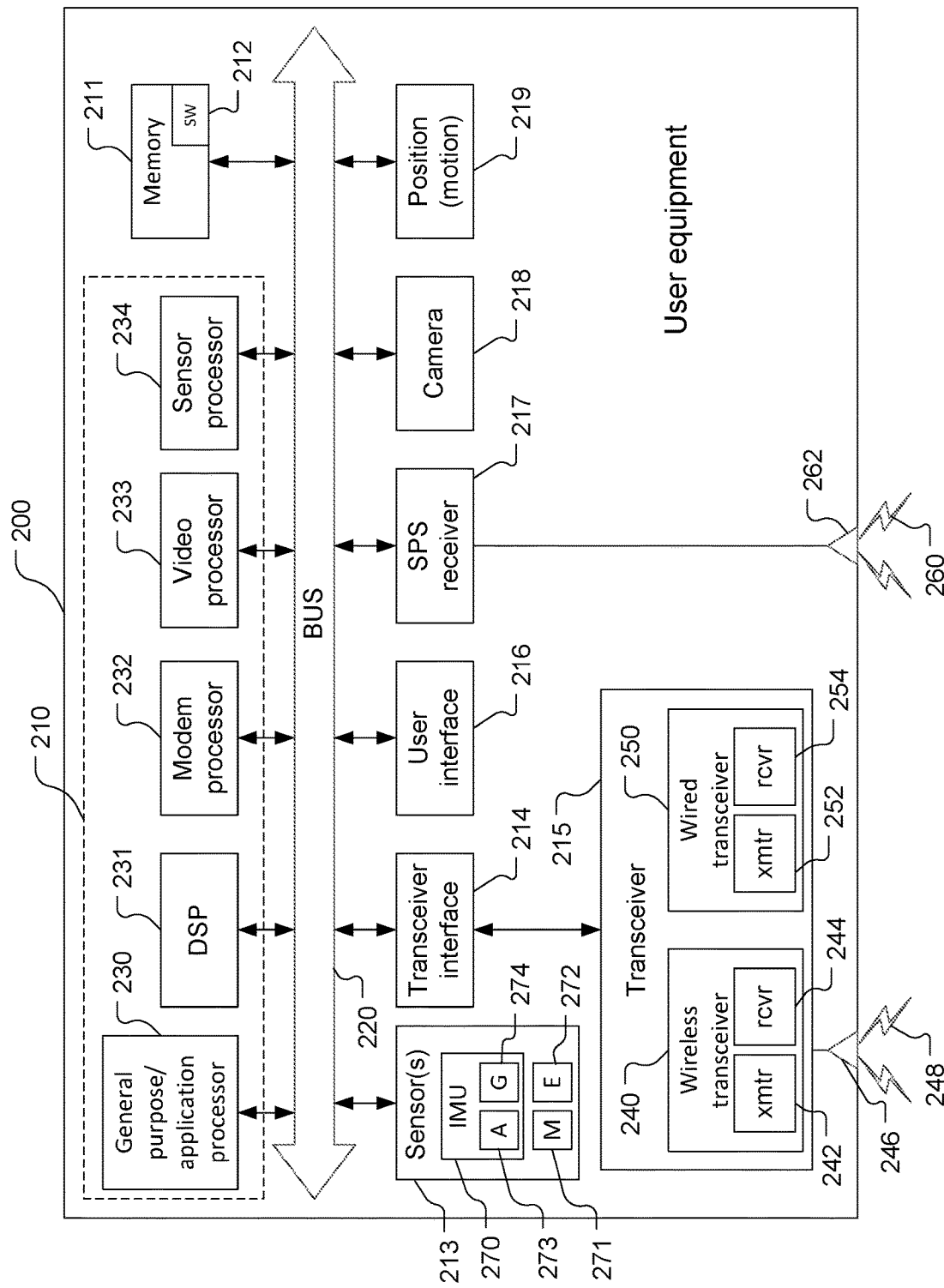
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes a wireless transceiver 240 and/or a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown processor-readable instructions apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/ IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/ integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-Vehicle-to-Everything (V2X) (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a transmitter 252 and a receiver 254 configured for wired communication, e.g., with the network 135 to send communications to, and receive communications from, the gNB 110*a*, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion. In an example the PMD 219 may be referred to as a Positioning Engine (PE), and may be performed by the general-purpose processor 230. For example, the PMD 219 may be a logical entity and may be integrated with the general-processor 230 and the memory 211.

Figure 3:
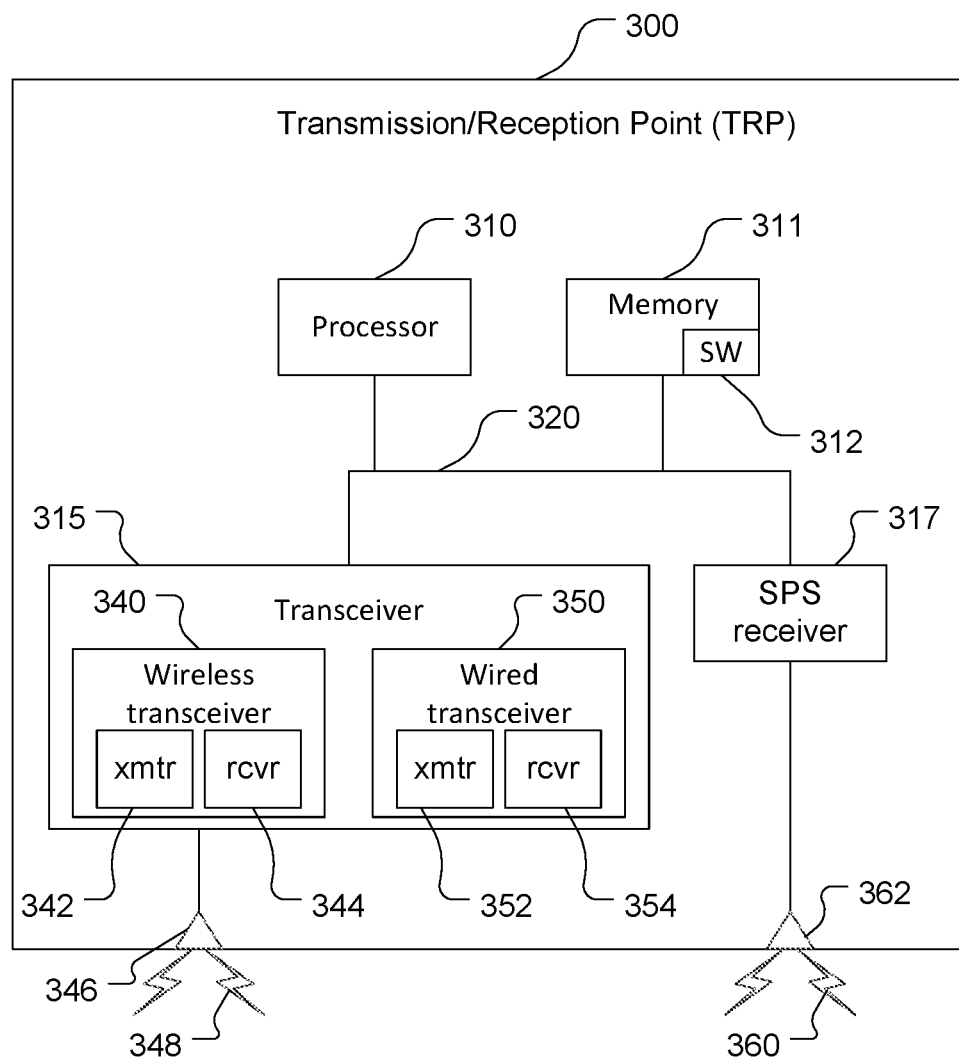
FIG. 3 is a block diagram of components of an example transmission/reception point.

Referring also to FIG. 3, an example of a TRP 300 of the gNB 110a, gNB 110b, and the ng-eNB 114, comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the gNB 110a, gNB 110b, ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels, downlink channels, and/or sidelink channels) and/or receiving (e.g., on one or more downlink channels, uplink channels, and/or sidelink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
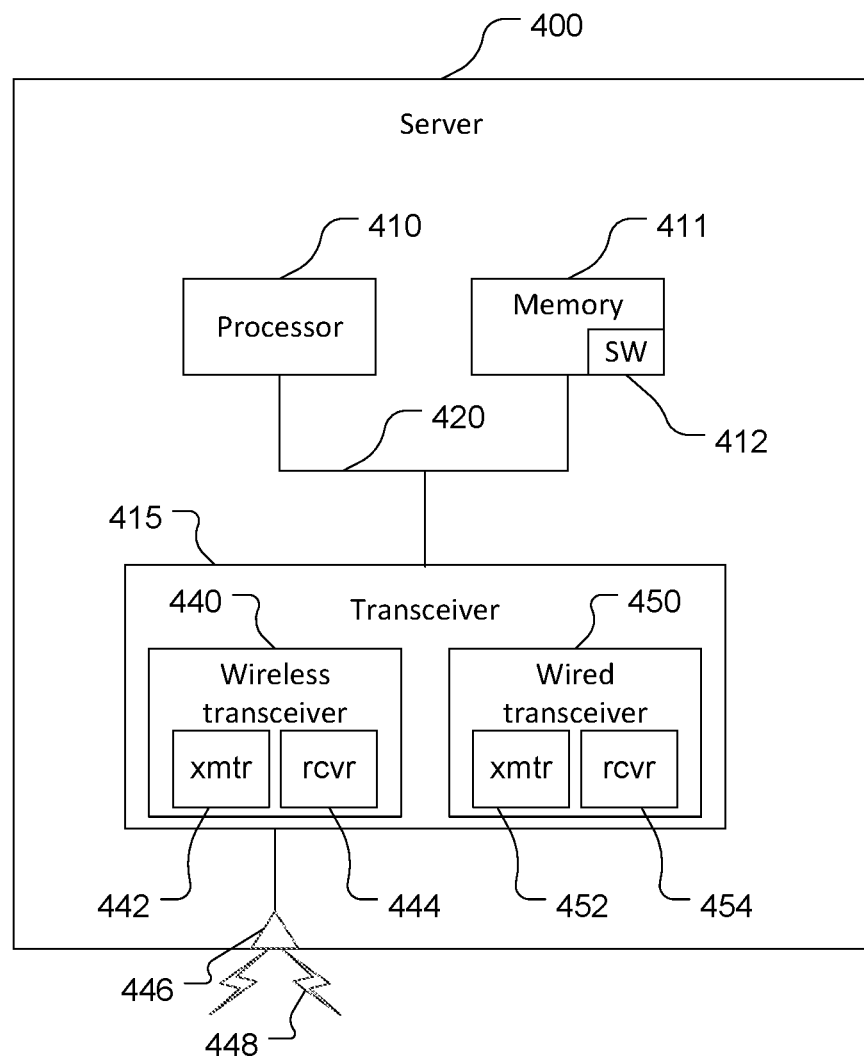
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 (e.g., the LMF 120) performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the network 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5:
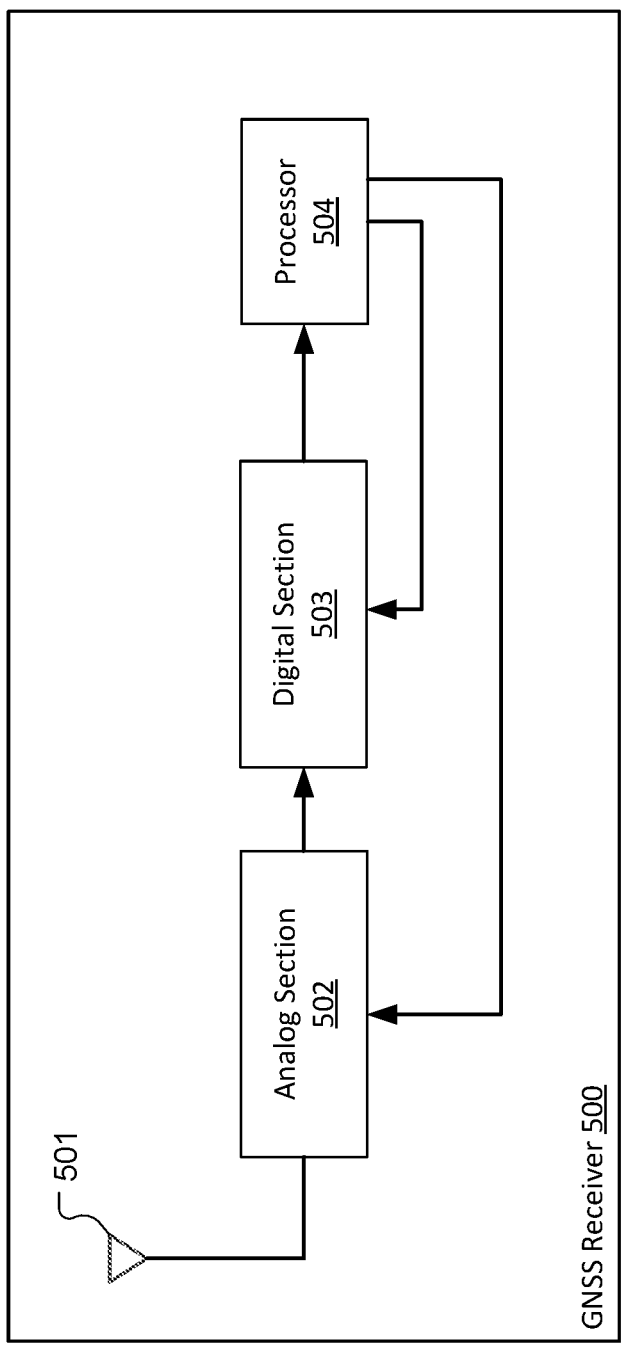
FIG. 5 is a diagram of an example GNSS receiver in a user equipment.

Referring to FIG. 5, a diagram of an example GNSS receiver 500 is shown. The SPS receivers 217, 317 in the UE 200 and the TRP 300 may include one or more components of the GNSS receiver 500 and thus may be examples of the GNSS receiver 500. In an example, the GNSS receiver 500 includes, without limitation, an antenna 501, an analog section 502, a digital section 503, and a processor 504. The antennas 262, 362, on the UE 200 and the TRP 300 are examples of the antenna 501. GNSS satellite signals are received by the antenna 501 and are coupled to an input of the analog section 502. The analog section 502 is configured to process the GNSS satellite signals and produce a digital intermediate frequency (IF) signal by sampling the GNSS satellite signal with an analog to digital converter (ADC). In one embodiment, the sample rate may be approximately 83 mega-samples per second (Ms/s). The digital IF signal is coupled to the input of the digital section 503. The digital section 503 is configured to utilize the digital IF signal to acquire and track satellites from within the GNSS satellite constellation by producing acquisition and tracking data that is coupled to the processor 504. The digital section 503 may be configured to implement one or more notch filters based on the presence of narrowband jamming signals in the GNSS spectrum. In an example, the digital section 503 may configure one or more notch filters as one or more digital filters with programmable center frequencies and bandwidths. The processor 504 may be a central processing unit CPU, a microprocessor, a digital signal processor, or any other such device that may read and execute programming instructions. The processor 504 is configured to analyze the acquisition and tracking data to determine navigation information such as location and velocity. An SV may transmit signals on a plurality of frequencies and the processor 504 may be configured to determine pseudorange and carrier-phase measurements based on GNSS models as known in the art. For example, in general, a pseudorange measurement $\rho_1^{[i]}$ to a satellite [i] on frequency $f_1$ can be modeled as:

$$\rho_1^{[i]} = r^{[i]} + (\delta t_u - \delta t_1^{[i]}) \cdot c + B_1 + I_1^{[i]} + T^{[i]} + \in_{\rho_1}^{[i]} \qquad (1)$$

where:
$r^{[i]}$ is the true range between satellite-[i] and user position.
$\delta t_u$ is the common bias in user equipment.
$\delta t_1^{[i]}$ is the satellite clock bias for satellite-[i] including any satellite group-delay on frequency $f_1$.
c is the speed of light.
$B_1$ is the additional bias in user equipment common for measurements made on frequency $f_1$.
$I_1^{[i]}$ is the ionospheric delay affecting the signal from satellite-[i] on frequency $f_1$.
$T^{[i]}$ is the delay introduced in signal from satellite-[i] by troposphere and is frequency-independent.
$\in_{\rho_1}^{[i]}$ is to account for noise and any unmodeled effects.

Other GNSS models and variables may also be used to determine a range to a SV.

Figure 6A:
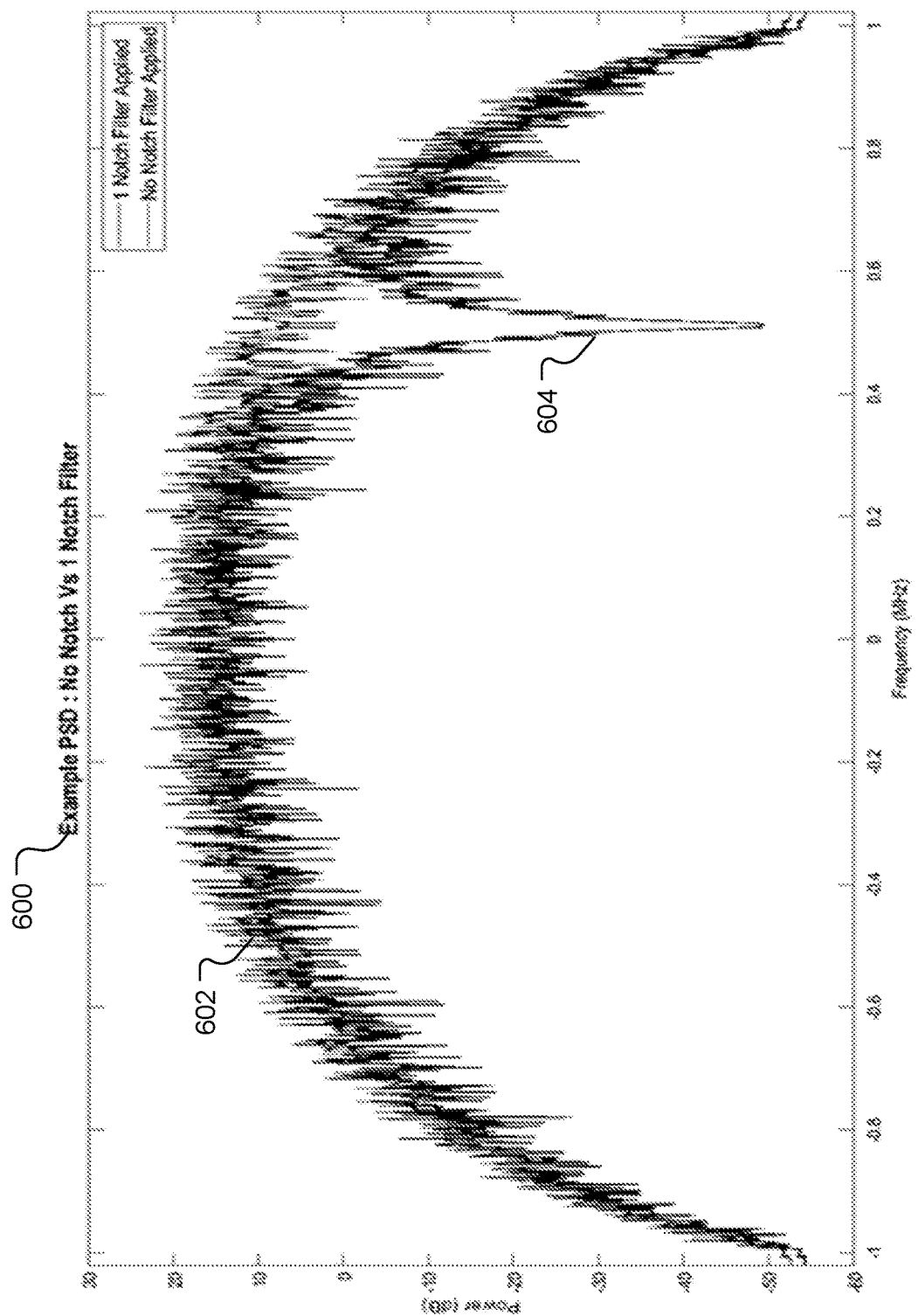
FIG. 6A is a graph of an example GNSS spectrum with a notch filter applied.
Figure 6B:
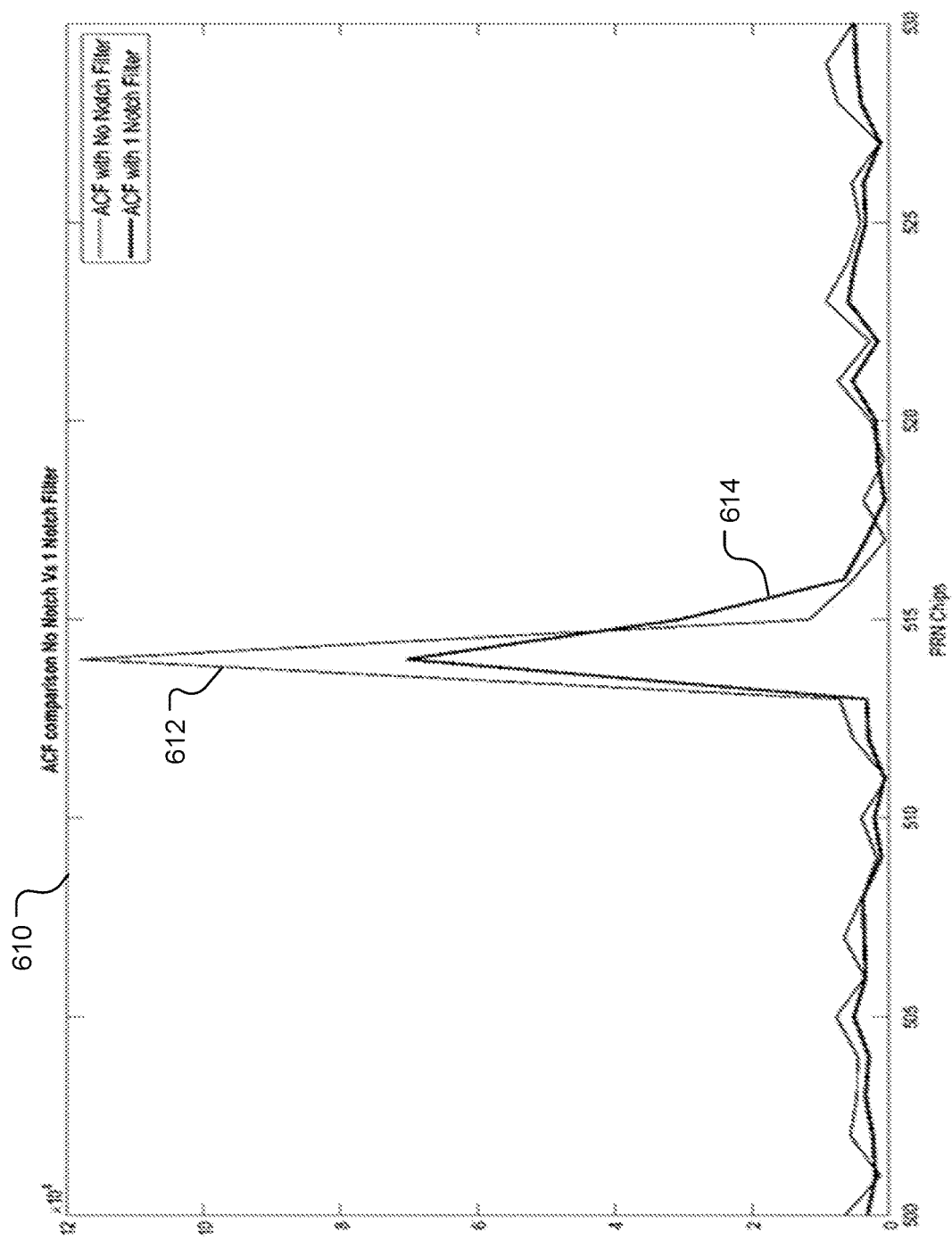
FIG. 6B is a graph of a comparison of an example auto-correlation function with and without a notch filter.

Referring to FIG. 6A, a graph 600 of an example GNSS spectrum 602 is shown. In operation, radio carrier waves may be modulated in various ways. GPS systems, for example, may utilize three different bands (e.g., L1, L2, and L5) and utilize phase modulation to convey codes from the SVs to the receivers. A GPS signal may utilize a spread spectrum such that the overall bandwidth of the GPS signal is much wider than the bandwidth of the information it is carrying. Specifically, L1 is centered on 1575.42 MHz, L2 is centered on 1227.60 MHz, and L5 on 1176.45 MHz, and the width of the GPS signals on these frequencies is larger than is expected. For example, the CA code signal is spread over a width of 2.046 MHz or so, the P(Y) code signal is spread over a width about 20.46 MHz on L1. The spectrum 602 depicts approximately 2 MHz around a doppler frequency of a SV (i.e., +/−1 MHz). The digital front end (DFE) of the GNSS receiver (e.g., the digital section 503) is configured to perform an auto-correlation process on the signals received in the spectrum 602 to obtain a codephase measurement. Local jamming caused by other transmitters or oscillators (e.g., harmonic signals) may significantly impact or impair the auto-correlation process. A GNSS receiver may be configured to implement one or more notch filters to reduce the impact of the jammers. For example, a notch filter at +0.5 MHz on the spectrum 602 will reduce the received power in the spectrum 602 as depicted by a signal dip 604. The notch filter and the corresponding signal dip 604 may affect the received auto-correlation function and corresponding codephase measurements. For example, referring to FIG. 6B, a graph 610 of a comparison of an example auto-correlation function (ACF) with and without a notch filter is shown. A typical ACF 612 provides a relatively high magnitude peak compared to a notched filtered ACF 614. The distortion of the overall ACF shape, and is some cases the loss in magnitude in the ACF, due to one or more notch filters may reduce the accuracy of a GNSS position computation. That is, the distortion of the ACF shape may cause a peak to be detected in the wrong code phase, which may result in a bias in the measurement. Accordingly, since the accuracy of a GNSS position estimate is based in part on how accurately it can measure the codephase, the use of the notch filters affects the position accuracy as well. The extent of the positioning error (i.e., the codephase impact) is dependent on the PRN code, the SV doppler, the notch frequency and the notch bandwidth. For example, referring to FIG. 6C, a plot 620 of codephase error values 622 based on example notch filter frequencies is shown. The plot 620 depicts the codephase errors (in centimeters) for a SV (i.e., SV ID 5) as the notch filter frequency is varied from −1 MHz to +1 MHz around the SV doppler frequency (i.e., zero in FIG. 6C). Each of the error values 622 is based on 100 kHz steps from −1 MHz to +1 MHz. The example error values 622 vary from approximately −50 cm to +25 cm. Other SVs (e.g., PRN codes), SV doppler values, and notch bandwidths (which may include multi-notch filters) may have different error distance values, and a different distribution of the error values.

Figure 6C:
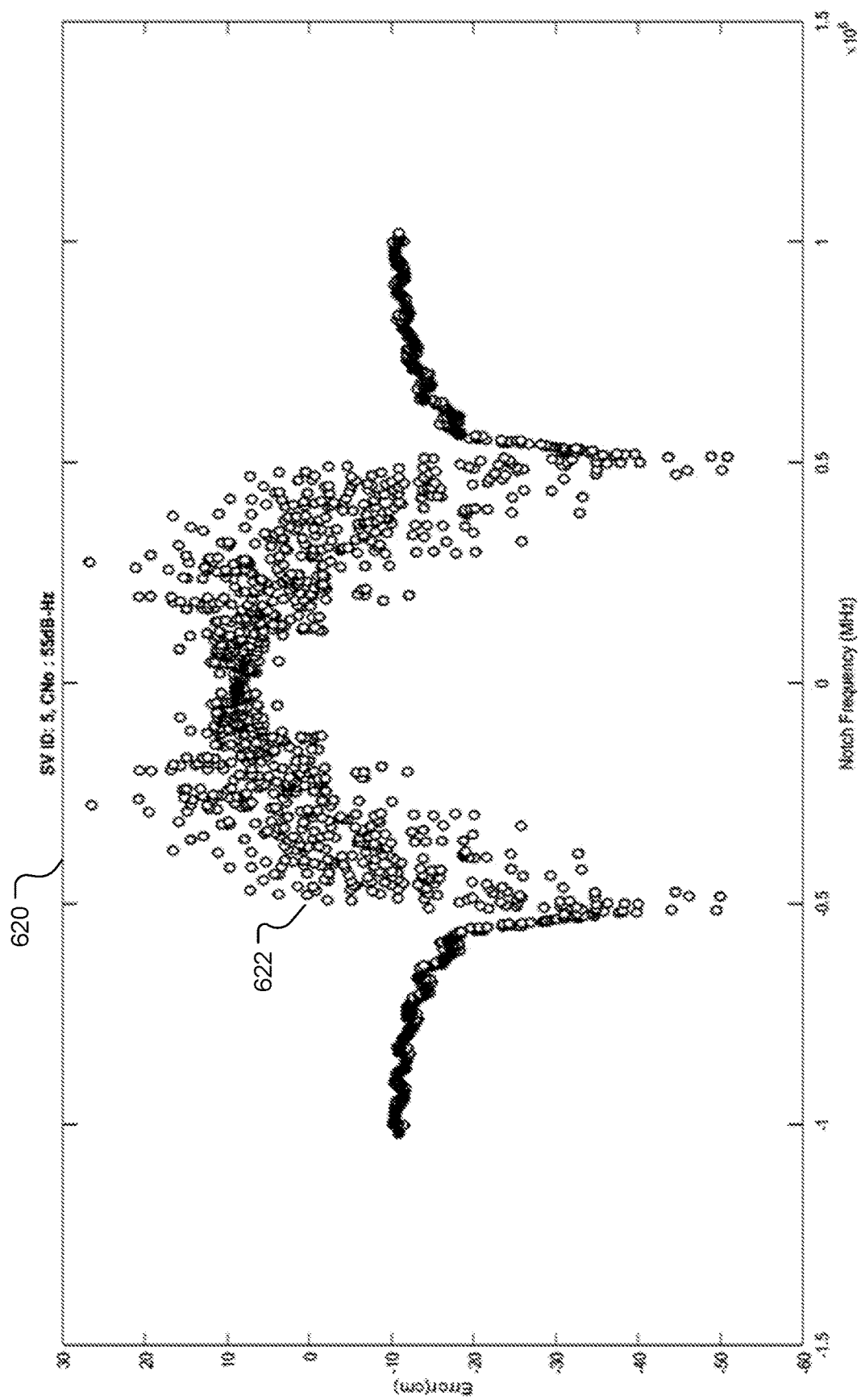
FIG. 6C is a plot of codephase error values based on example notch filter frequencies.
Figure 7:
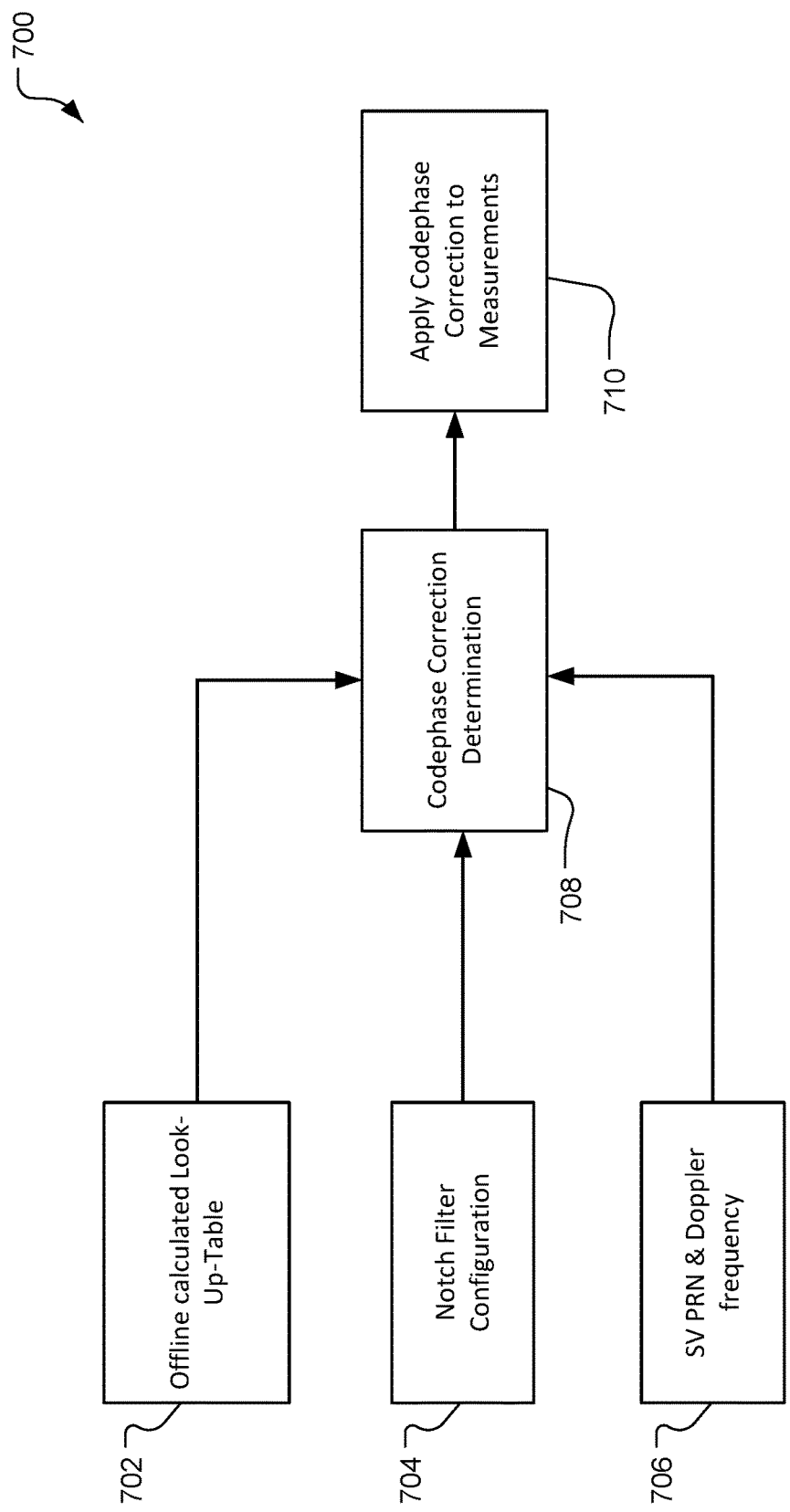
FIG. 7 is a block diagram of an example process for offline phase compensation based on a notch filter configuration.

Referring to FIG. 7, with further reference to FIGS. 5 and 6A-6C, a block diagram of an example process 700 for offline phase compensation based on a notch filter configuration is shown. The process 700 utilizes one or more offline look-up-tables (LUTs) 702 to apply a codephase correction at stage 710 based on notch filter configurations 704 and SV PRN and doppler frequency information 706. In general, the codephase correction values in the LUTs 702 are dependent on three parameters: SVID (e.g., SV PRN), SV doppler frequency and notch configuration information (i.e., the number of notches, each notch frequency and each notch bandwidth). In an example, for each of the notch configurations, one two-dimensional array LUT may be computed and stored. Different LUTs for different combinations of notches may also be utilized, and each LUT may be a two-dimensional array such that the $\{i, j\}^{th}$ element would be the code-phase correction value corresponding to $i^{th}$ SVID and $j^{th}$ SV Doppler (where, SVIDs are finite numbers). Different notch filter configurations 704 and SV doppler resolution in a LUT grid may be selected based on operational requirements. For example, in a bandwidth of 2 MHz, the SV doppler may be varied in steps of 1 kHz to give 2001 grid points, or 100 kHz to give 21 grid points. The sizes of corresponding LUTs may be multiplied accordingly.

In an embodiment, the processor 504 may be configured to access a local memory module(s) containing the one or more LUTs 702 which store codephase error values based on PRN codes, notch frequencies, notch bandwidths, and SV doppler information. For example, the notch filter configuration 704 may indicate a notch frequency (e.g., +/−1 MHz from SV doppler value) and the notch bandwidth (e.g., 1, 2, 5, 10 kHz, etc.). The SV PRN and doppler frequency information 706 are associated with the SV that is transmitting the signal the GNSS receiver 500 is receiving. The LUTs 702 contain error measurement data points such as depicted in FIG. 6C. The codephase correction determination at stage 708 may be based on a select, sort and/or match functions or algorithms, or other stored procedures, executing on the processor 504 to select a codephase error value from the LUTs 702 based on the notch filter configuration 704 and the SV PRN and doppler frequency information 706. The codephase correction value may be a distance (e.g., 1 cm, 5 cm, 10 cm, 100 cm etc.), the processor 504 is configured to apply the correction to a distance measurement (e.g., pseudorange, carrier-phase measurements) based on the SV signal at stage 710. The offline LUTs 702 provides the advantage of obtaining relatively quick codephase error solutions at the expense of memory usage since the different variations of notch filter configurations and SV information must be stored. Some memory efficiencies may be gained by increased quantization of the values in LUTs 702 and the use of interpolation routines to estimate the codephase error.

Figure 8:
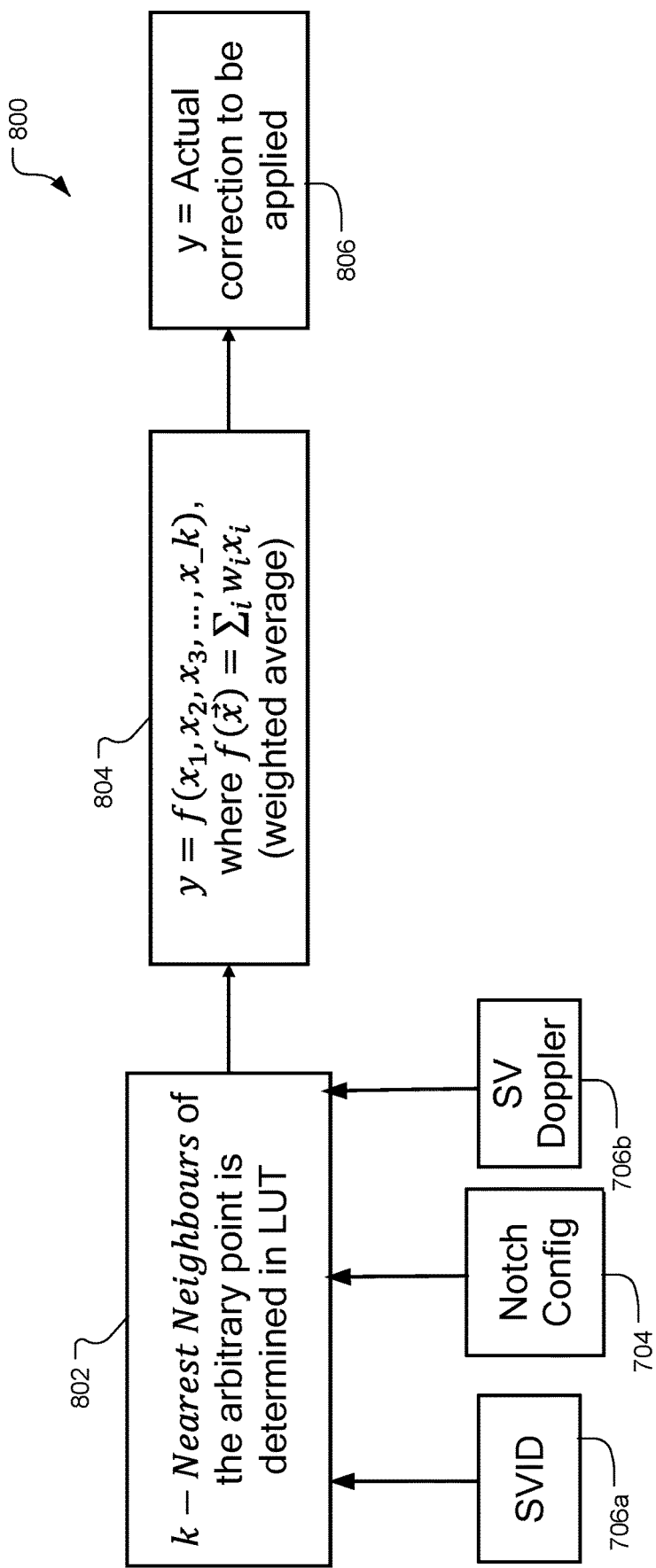
FIG. 8 is a block diagram of an example process for computing a codephase correction value.

Referring to FIG. 8, an example process 800 for computing a codephase correction value is shown. Based on the notch filter configurations 704, and the SV PRN and doppler frequency information 706 (i.e., the SVID 706a and SV doppler 706b) that the GNSS receiver 500 is receiving, a codephase correction may be computed by smooth interpolation between values in the LUT 702. In general, the codephase values in the LUTs 702 are known at finite and discrete points in a two-dimensional space and an interpolation function may be used to compute a value at other arbitrary points in that space. For example, at stage 802 the processor 504 may be configured to receive input from the digital section 503 associated with received SV signals. The input may include the SVID 706a, the SV doppler 706b and the notch configurations 704. The processor 504 is configured to obtain the nearest 'k' neighbors to the input values in the LUTs 702 and then compute a weighted average 'y' of the codephase error for each of the neighbors at stage 804. The weighted average 'y' may be applied as the codephase correction value at stage 806. The process 800 is an example, and not a limitation, as other multi-variate interpolation techniques may also be used to determine the final code-phase correction value.

Figure 9:
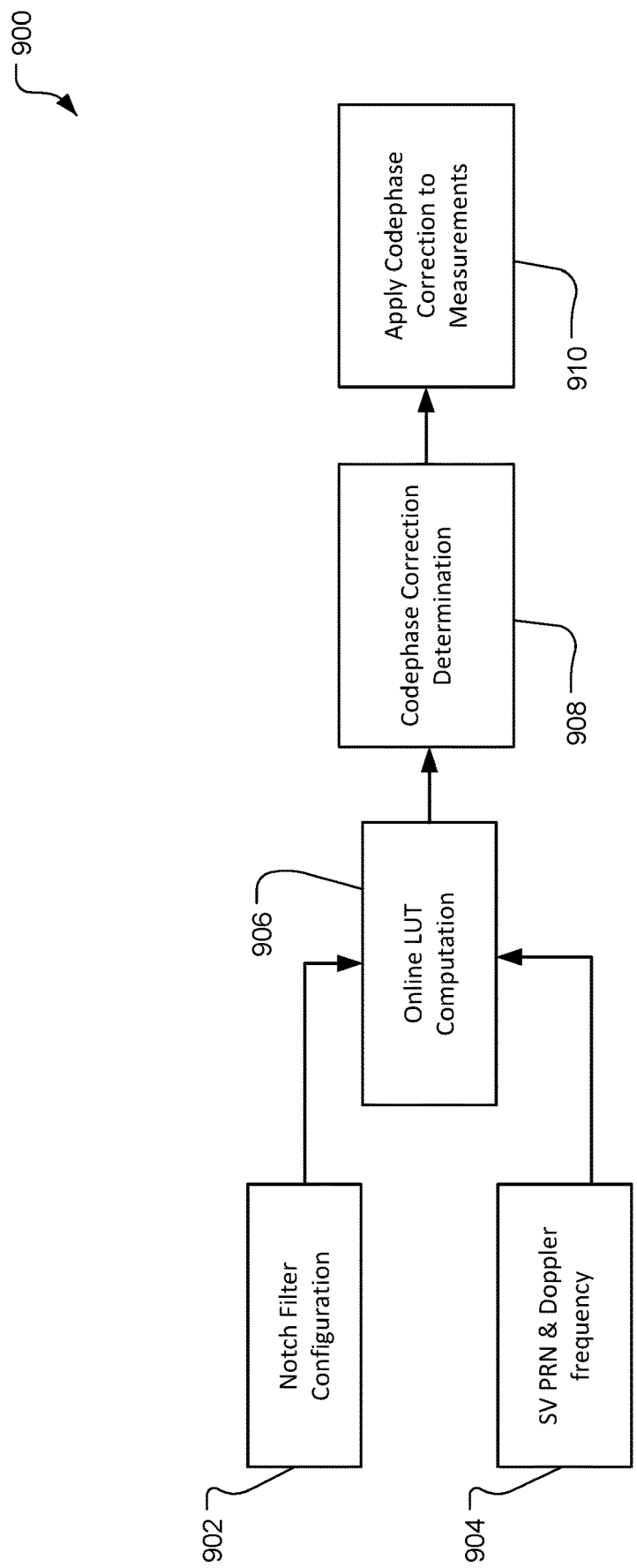
FIG. 9 is a block diagram of an example process for online phase computation based on a notch filter configuration.

Referring to FIG. 9, an example process 900 for online phase computation based on a notch filter configuration is shown. In contrast to the offline process 700 in FIG. 7, which depends on the LUTs 702, the online process 900 computes the LUT values locally when the configuration of GNSS receiver 500 changes (e.g., when new jamming signals are detected). For example, the processor 504 may receive notch filter configuration information 902 and SV PRN and doppler frequency information 904 from the digital section 503 as previously described. At stage 906, the processor 504 may compute LUT table values for the SV via simulations with discrete points as described in FIGS. 6A-6C. At stage 908, the processor 504 may utilize notch filter configuration information 902 and SV PRN and doppler frequency information 904 and an interpolation technique, such as described in FIG. 8, to obtain a codephase correction value based on the locally generated LUT. At stage 910, the processor 504 may apply the codephase correction to the distance measurement (e.g., pseudorange, carrier-phase measurements) computed for the received SV signal.

Figure 10A:
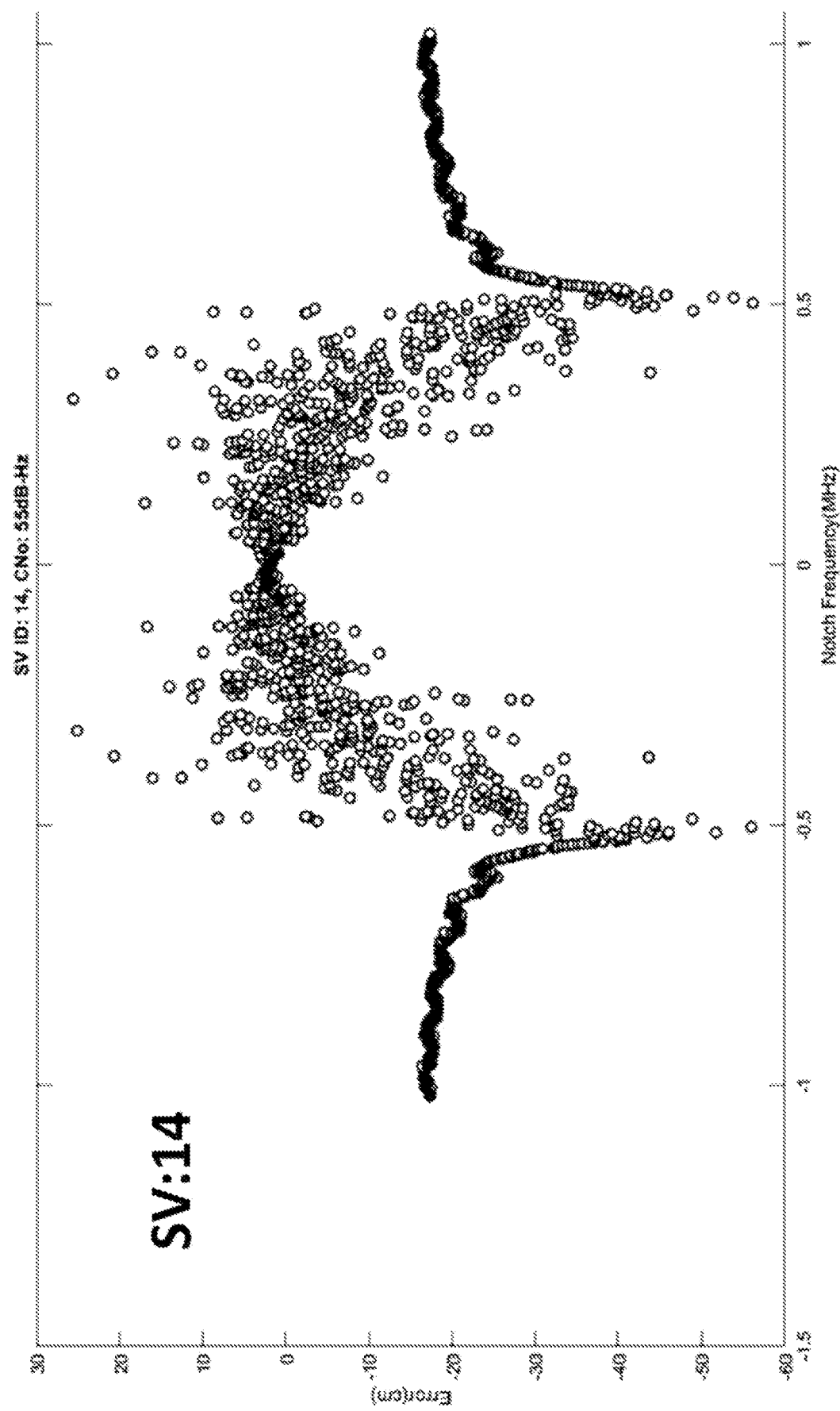
FIGS. 10A-10D includes example plots of codephase errors for a plurality of satellite vehicles and notch filter configurations.
Figure 10B:
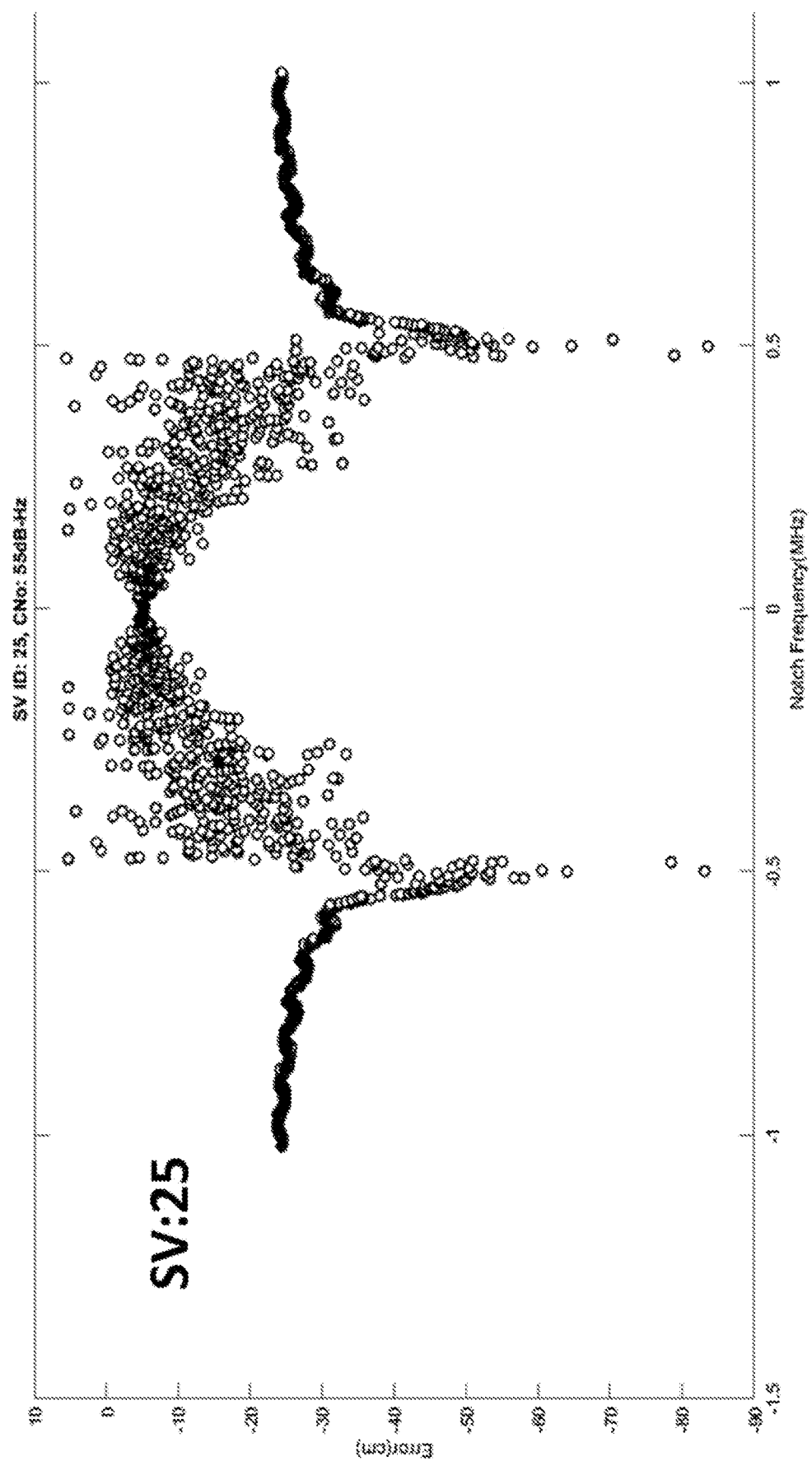
Figure 10C:
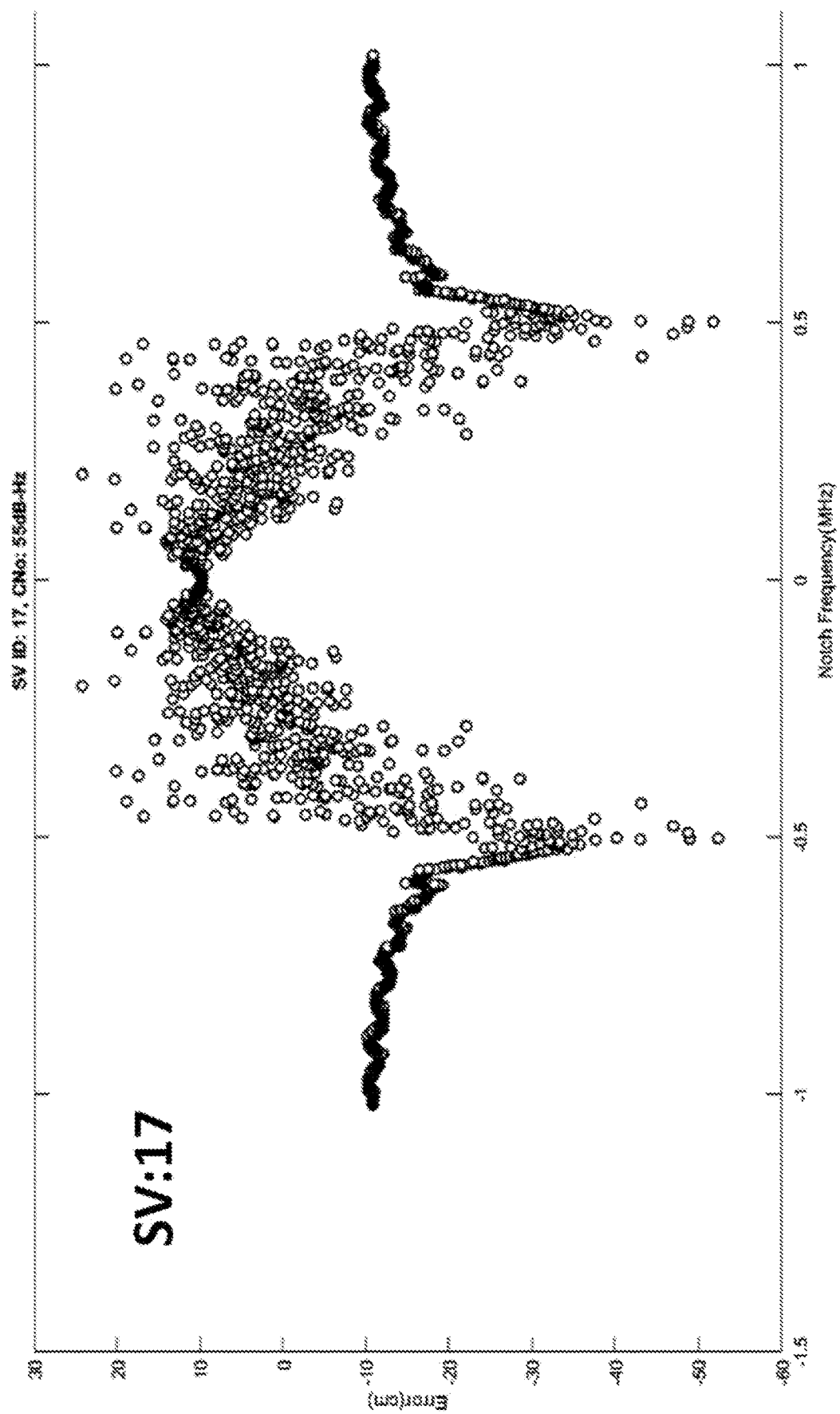
Figure 10D:
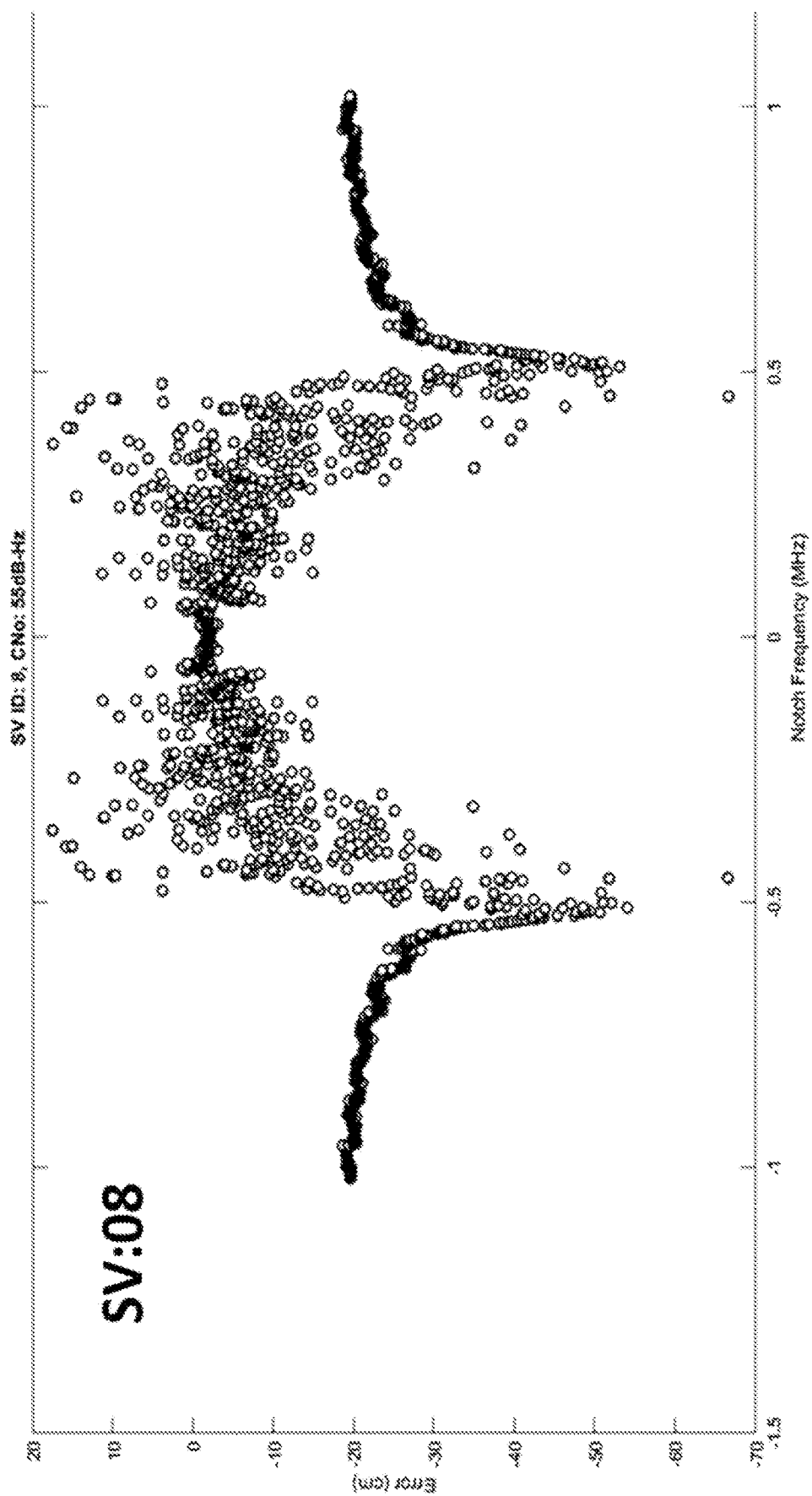

Referring to FIGS. 10A-10D, example plots of codephase errors for a plurality of satellite vehicles and notch filter configurations are shown. The plots are examples and are provided to illustrate that different SV PRNs may have different notch frequency error distributions. The depicted error values represent discrete values in LUTs, which may be generated offline (as in the process 700) or online (as in the process 900). The plotted error values represent notch frequencies in steps of 100 kHz between −1 MHz and +1 MHz relative to the SV doppler frequency (e.g., zero doppler in the plots). As an example, and not a limitation, the typical codephase correction values for GPS L1 CA signals are between +1 meter and −1 meter. Other signal types may have different ranges of correction values. FIG. 10A depicts a first example SV (SV:14) with a first error distribution between −60 cm and +30 cm. FIG. 10B depicts a second example SV (SV:25) with a second error distribution between −90 cm and +10 cm. FIG. 10C depicts a third example SV (SV:17) with a third error distribution between −60 cm and +30 cm. FIG. 10D depicts a fourth example SV (SV:08) with a fourth error distribution between −70 cm and 20 cm. The SV, plots and sample sizes (e.g., notch filter step values) are examples and not limitations. Other simulations may be run with other SVs and increased or decreased notch filter steps.

Figure 11:
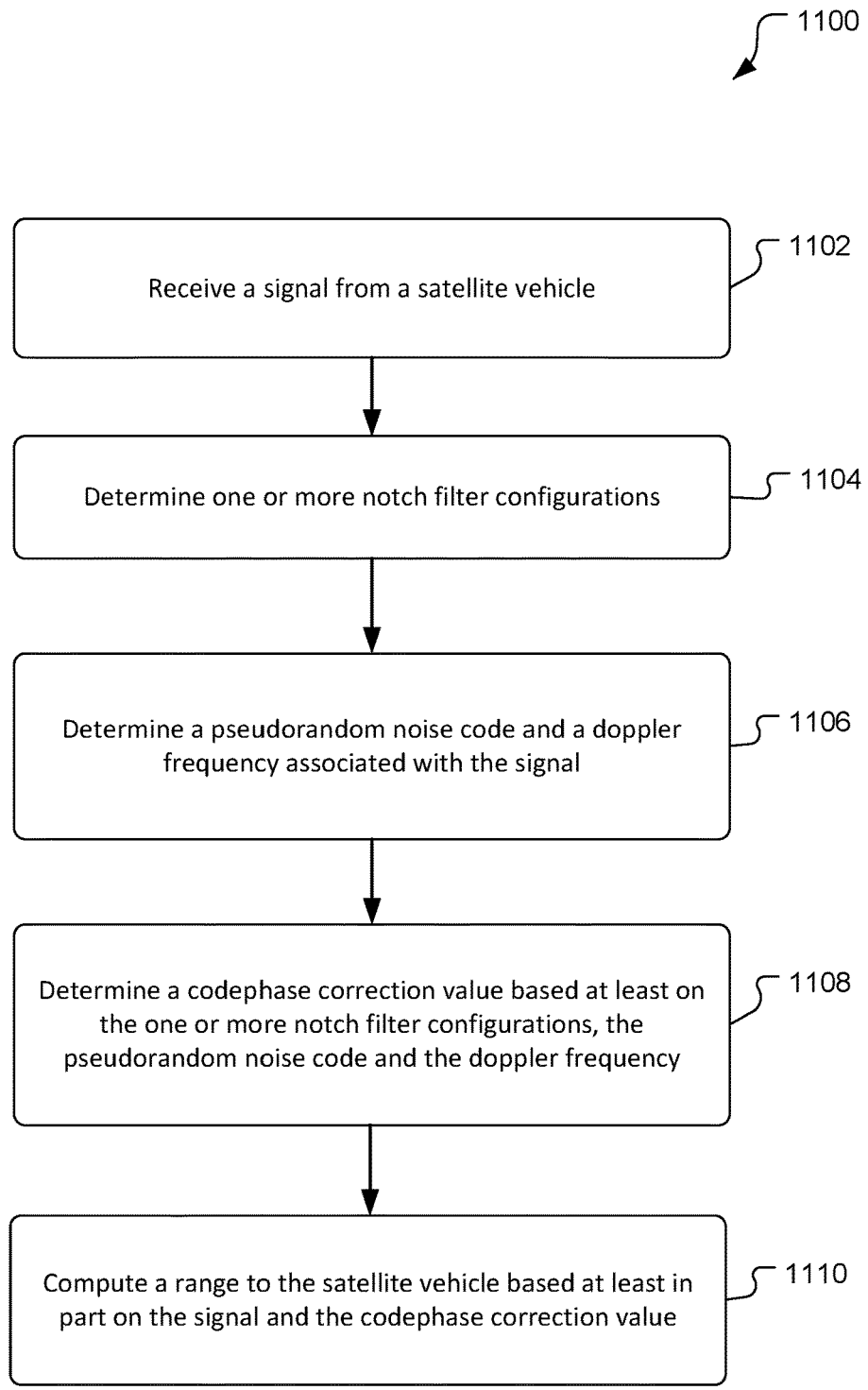
FIG. 11 is a process flow diagram of an example method for computing a range to a satellite vehicle.

Referring to FIG. 11, with further reference to FIGS. 1-10D, a method 1100 for computing a range to a satellite vehicle includes the stages shown. The method 1100 is, however, an example and not limiting. The method 1100 may be altered, e.g., by having stages added, removed, rearranged, combined, performed concurrently, and/or having single stages split into multiple stages.

At stage 1102, the method includes receiving a signal from a satellite vehicle. The analog section 502 of the GNSS receiver 500 is a means for receiving a signal from a SV. In general, GNSS SVs transmit navigation signals in two or more frequencies in the L band. These signals contain ranging codes and navigation data to allow the GNSS receiver 500 to compute the traveling time from satellite to receiver and the satellite coordinates at any epoch. The signal may include a carrier, a ranging code (e.g., SVID, PRN sequence or PRN code), and other navigation data (e.g., information on the SV ephemeris, clock bias parameters, almanac information, SV information, and other associated navigational information).

At stage 1104, the method includes determining one or more notch filter configurations. The digital section 503 and the processor 504 are means for determining one or more notch filter configurations. The notch filters may be based on the presence of narrowband jamming signals generated by local or external RF sources. In an example, one or more jamming signals may be known based on the state of a UE (i.e., when Wi-Fi or BLUETOOTH transmitters are active). In an embodiment, the processor 504 may be configured to perform a spectrum analysis to find jamming signals. The notch filter configurations may include a frequency component and a bandwidth component to mitigate the interference of the jamming signal or signals. In an embodiment, a notch filter configuration may include a plurality of frequencies, with each notch filter having the same or different bandwidths.

At stage 1106, the method includes determining a pseudorandom noise code and a doppler frequency associated with the signal. The processor 504 is a means for determining the PRN code and doppler frequency. The PRN code is included in the signal received at stage 1102. The doppler frequency corresponds to the doppler shift of the received signal based primarily on the relative velocities between the antennas on the SV and the GNSS receiver. Other clock frequency error offsets may also be included in the doppler frequency. In general, the doppler shift of the signal is the time derivative of the carrier phase.

At stage 1108, the method includes determining a codephase correction value based at least on the one or more notch filter configurations, the pseudorandom noise code and the doppler frequency. The processor 504 is a means for determining the codephase correction value. In operation, the processor 504 may utilize one or more LUTs including the notch filter configuration information, the SV PRN and doppler frequency information and the associated codephase correction value. For example, query tools such as sort, select, match, etc. may be used to determine the codephase correction value based on notch filter and SV configuration information. The LUT may be provided to a UE via assistance data (i.e., an offline solution), and/or one or more LUTs may be generated locally on the UE (i.e., an online solution). In an offline solution, the communication network 100 may provide the assistance data to the UE via the wireless transceiver 240 with the LUTs. The assistance data may be sent via network protocols such as LPP and Radio Resource Control (RRC) messaging. Other messaging, such as sidelink techniques, may also be used to propagate the LUTs to other UEs in a network. The one or more LUT tables include codephase correction values for the various combinations of PRN codes (e.g., SV IDs), doppler frequencies, and the notch filter configurations. The codephase correction values may be a distance such as the values in FIGS. 6C and 10A-10D. Interpolation techniques, such as described in FIG. 8, may also be used to obtain a codephase correction value from the LUTs.

At stage 1110, the method includes computing a range to the satellite vehicle based at least in part on the signal and the codephase correction value. The processor 504 is a means for computing a range to the SV. In an example, the processor 504 may determine a pseudorange to the SV based on the signal and apply appropriate bias and corrections as known in the art and described in equation 1. The codephase value determined at stage 1108 may be applied to the pseudorange to produce the range value.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Components, functional or otherwise, shown in the figures and/or discussed herein as being connected or communicating with each other are communicatively coupled unless otherwise noted. That is, they may be directly or indirectly connected to enable communication between them.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method for determining a range to a satellite vehicle with a receiver, comprising:
   receiving a signal from the satellite vehicle;
   determining one or more notch filter configurations;
   determining a pseudorandom noise code and a doppler frequency associated with the signal;
   determining a codephase correction value based at least on the one or more notch filter configurations, the pseudorandom noise code and the doppler frequency; and
   computing the range to the satellite vehicle based at least in part on the signal and the codephase correction value.

2. The method of clause 1 wherein determining the codephase correction value includes obtaining the codephase correction value from a look-up-table based on the one or more notch filter configurations, the pseudorandom noise code and the doppler frequency.

3. The method of clause 2 further comprising receiving assistance data from a network entity, wherein the assistance data includes the look-up-table.

4. The method of method of clause 3 wherein the assistance data is received via one or more Long Term Evolution Positioning Protocol (LPP) messages.

5. The method of method of clause 3 wherein the assistance data is received via one or more Radio Resource Control (RRC) messages.

6. The method of clause 2 wherein determining the codephase correction value includes obtaining the codephase correction value based on an interpolation function.

7. The method of clause 1 further comprising generating a look-up-table with the receiver based on modeled auto-correlation functions for a plurality of notch filter configurations, and wherein determining the codephase correction value includes obtaining the codephase correction value from the look-up-table based on the one or more notch filter configurations, the pseudorandom noise code and the doppler frequency.

8. The method of clause 1 wherein the one or more notch filter configurations include one or more notch frequencies and one or more bandwidths associated with the one or more notch frequencies.

9. The method of clause 1 wherein computing the range to the satellite vehicle includes determining a pseudorange to the satellite vehicle based on the signal.

10. The method of clause 1 wherein the receiver includes one or more notch filters comprised of one or more digital filters with programmable center frequencies and bandwidths.

11. An apparatus, comprising:
    a memory;
    at least one satellite positioning system receiver configured to receive a signal from a satellite vehicle;
    at least one processor communicatively coupled to the memory and the at least one satellite positioning system receiver and configured to:
    receive the signal from the satellite vehicle;
    determine one or more notch filter configurations;
    determine a pseudorandom noise code and a doppler frequency associated with the signal;
    determine a codephase correction value based at least on the one or more notch filter configurations, the pseudorandom noise code and the doppler frequency; and
    compute a range to the satellite vehicle based at least in part on the signal and the codephase correction value.

12. The apparatus of clause 11 wherein the at least one processor is further configured to obtain the codephase correction value from a look-up-table based on the one or more notch filter configurations, the pseudorandom noise code and the doppler frequency.

13. The apparatus of clause 12 further comprising at least one transceiver communicatively coupled to the at least one processor, wherein the at least one processor is further configured to receive assistance data from a network entity, and wherein the assistance data includes the look-up-table.

14. The apparatus of clause 13 wherein the assistance data is received via one or more Long Term Evolution Positioning Protocol (LPP) messages.

15. The apparatus of clause 13 wherein the assistance data is received via one or more Radio Resource Control (RRC) messages.

16. The apparatus of clause 12 wherein the at least one processor is further configured to obtain the codephase correction value based on an interpolation function.

17. The apparatus of clause 11 wherein the at least one processor is further configured to generate a look-up-table based on modeled auto-correlation functions for a plurality of notch filter configurations, and obtain the codephase correction value from the look-up-table based on the one or more notch filter configurations, the pseudorandom noise code and the doppler frequency.

18. The apparatus of clause 11 wherein the one or more notch filter configurations include one or more notch frequencies and one or more bandwidths associated with the one or more notch frequencies.

19. The apparatus of clause 11 wherein the at least one processor is further configured to determine a pseudorange to the satellite vehicle based on the signal.

20. The apparatus of clause 11 wherein the one or more notch filter configurations comprise one or more digital filters with programmable center frequencies and bandwidths.

21. An apparatus for determining a range to a satellite vehicle, comprising:
    means for receiving a signal from the satellite vehicle;
    means for determining one or more notch filter configurations;
    means for determining a pseudorandom noise code and a doppler frequency associated with the signal;
    means for determining a codephase correction value based at least on the one or more notch filter configurations, the pseudorandom noise code and the doppler frequency; and
    means for computing the range to the satellite vehicle based at least in part on the signal and the codephase correction value.

22. The apparatus of clause 21 wherein the means for determining the codephase correction value includes means for obtaining the codephase correction value from a look-up-table based on the one or more notch filter configurations, the pseudorandom noise code and the doppler frequency.

23. The apparatus of clause 22 further comprising means for receiving assistance data from a network entity, wherein the assistance data includes the look-up-table.

24. The apparatus of clause 23 wherein the assistance data is received via one or more Long Term Evolution Positioning Protocol (LPP) messages.

25. The apparatus of clause 23 wherein the assistance data is received via one or more Radio Resource Control (RRC) messages.

26. The apparatus of clause 22 wherein the means for determining the codephase correction value includes means for obtaining the codephase correction value based on an interpolation function.

27. The apparatus of clause 21 further comprising means for generating a look-up-table based on modeled auto-correlation functions for a plurality of notch filter configurations, and wherein the means determining the codephase correction value includes means for obtaining the codephase correction value from the look-up-table based on the one or more notch filter configurations, the pseudorandom noise code and the doppler frequency.

28. The apparatus of clause 21 wherein the one or more notch filter configurations include one or more notch frequencies and one or more bandwidths associated with the one or more notch frequencies.

29. The apparatus of clause 21 wherein the means for computing the range to the satellite vehicle includes means for determining a pseudorange to the satellite vehicle based on the signal.

30. The apparatus of clause 21 further comprising one or more notch filters consisting of one or more digital filters with programmable center frequencies and bandwidths.

31. A non-transitory processor-readable storage medium comprising processor-readable instructions to cause one or more processors to determine a range to a satellite vehicle, comprising:
   code for receiving a signal from the satellite vehicle;
   code for determining one or more notch filter configurations;
   code for determining a pseudorandom noise code and a doppler frequency associated with the signal;
   code for determining a codephase correction value based at least on the one or more notch filter configurations, the pseudorandom noise code and the doppler frequency; and
   code for computing the range to the satellite vehicle based at least in part on the signal and the codephase correction value.

32. The non-transitory processor-readable storage medium of clause 31 wherein the code for determining the codephase correction value includes code for obtaining the codephase correction value from a look-up-table based on the one or more notch filter configurations, the pseudorandom noise code and the doppler frequency.

33. The non-transitory processor-readable storage medium of clause 32 further comprising code for receiving assistance data from a network entity, wherein the assistance data includes the look-up-table.

34. The non-transitory processor-readable storage medium of clause 33 wherein the assistance data is received via one or more Long Term Evolution Positioning Protocol (LPP) messages.

35. The non-transitory processor-readable storage medium of clause 33 wherein the assistance data is received via one or more Radio Resource Control (RRC) messages.

36. The non-transitory processor-readable storage medium of clause 32 wherein the code for determining the codephase correction value includes code for obtaining the codephase correction value based on an interpolation function.

37. The non-transitory processor-readable storage medium of clause 31 further comprising code for generating a look-up-table based on modeled auto-correlation functions for a plurality of notch filter configurations, and wherein the code determining the codephase correction value includes code for obtaining the codephase correction value from the look-up-table based on the one or more notch filter configurations, the pseudorandom noise code and the doppler frequency.

38. The non-transitory processor-readable storage medium of clause 31 wherein the one or more notch filter configurations include one or more notch frequencies and one or more bandwidths associated with the one or more notch frequencies.

39. The non-transitory processor-readable storage medium of clause 31 wherein the code for computing the range to the satellite vehicle includes code for determining a pseudorange to the satellite vehicle based on the signal.

40. The non-transitory processor-readable storage medium of clause 31 further comprising one or more notch filters consisting of one or more digital filters with programmable center frequencies and bandwidths.

The invention claimed is:

1. A method for determining a range to a satellite vehicle with a receiver, comprising:
   receiving a signal from the satellite vehicle;
   determining one or more notch filter configurations;
   determining a pseudorandom noise code and a doppler frequency associated with the signal;
   determining a codephase correction value based at least on the one or more notch filter configurations, the pseudorandom noise code and the doppler frequency; and
   computing the range to the satellite vehicle based at least in part on the signal and the codephase correction value.

2. The method of claim 1 wherein determining the codephase correction value includes obtaining the codephase correction value from a look-up-table based on the one or more notch filter configurations, the pseudorandom noise code and the doppler frequency.

3. The method of claim 2 further comprising receiving assistance data from a network entity, wherein the assistance data includes the look-up-table.

4. The method of method of claim 3 wherein the assistance data is received via one or more Long Term Evolution Positioning Protocol (LPP) messages.

5. The method of method of claim 3 wherein the assistance data is received via one or more Radio Resource Control (RRC) messages.

6. The method of claim 2 wherein determining the codephase correction value includes obtaining the codephase correction value based on an interpolation function.

7. The method of claim 1 further comprising generating a look-up-table with the receiver based on modeled auto-correlation functions for a plurality of notch filter configurations, and wherein determining the codephase correction value includes obtaining the codephase correction value from the look-up-table based on the one or more notch filter configurations, the pseudorandom noise code and the doppler frequency.

8. The method of claim 1 wherein the one or more notch filter configurations include one or more notch frequencies and one or more bandwidths associated with the one or more notch frequencies.

9. The method of claim 1 wherein computing the range to the satellite vehicle includes determining a pseudorange to the satellite vehicle based on the signal.

10. The method of claim 1 wherein the receiver includes one or more notch filters comprised of one or more digital filters with programmable center frequencies and bandwidths.

11. An apparatus, comprising:
   a memory;
   at least one satellite positioning system receiver configured to receive a signal from a satellite vehicle;

at least one processor communicatively coupled to the memory and the at least one satellite positioning system receiver and configured to:
  receive the signal from the satellite vehicle;
  determine one or more notch filter configurations;
  determine a pseudorandom noise code and a doppler frequency associated with the signal;
  determine a codephase correction value based at least on the one or more notch filter configurations, the pseudorandom noise code and the doppler frequency; and
  compute a range to the satellite vehicle based at least in part on the signal and the codephase correction value.

12. The apparatus of claim 11 wherein the at least one processor is further configured to obtain the codephase correction value from a look-up-table based on the one or more notch filter configurations, the pseudorandom noise code and the doppler frequency.

13. The apparatus of claim 12 further comprising at least one transceiver communicatively coupled to the at least one processor, wherein the at least one processor is further configured to receive assistance data from a network entity, and wherein the assistance data includes the look-up-table.

14. The apparatus of claim 13 wherein the assistance data is received via one or more Long Term Evolution Positioning Protocol (LPP) messages.

15. The apparatus of claim 13 wherein the assistance data is received via one or more Radio Resource Control (RRC) messages.

16. The apparatus of claim 12 wherein the at least one processor is further configured to obtain the codephase correction value based on an interpolation function.

17. The apparatus of claim 11 wherein the at least one processor is further configured to generate a look-up-table based on modeled auto-correlation functions for a plurality of notch filter configurations, and obtain the codephase correction value from the look-up-table based on the one or more notch filter configurations, the pseudorandom noise code and the doppler frequency.

18. The apparatus of claim 11 wherein the one or more notch filter configurations include one or more notch frequencies and one or more bandwidths associated with the one or more notch frequencies.

19. The apparatus of claim 11 wherein the at least one processor is further configured to determine a pseudorange to the satellite vehicle based on the signal.

20. The apparatus of claim 11 wherein the one or more notch filter configurations comprise one or more digital filters with programmable center frequencies and bandwidths.

21. An apparatus for determining a range to a satellite vehicle, comprising:
  means for receiving a signal from the satellite vehicle;
  means for determining one or more notch filter configurations;
  means for determining a pseudorandom noise code and a doppler frequency associated with the signal;
  means for determining a codephase correction value based at least on the one or more notch filter configurations, the pseudorandom noise code and the doppler frequency; and
  means for computing the range to the satellite vehicle based at least in part on the signal and the codephase correction value.

22. The apparatus of claim 21 wherein the means for determining the codephase correction value includes means for obtaining the codephase correction value from a look-up-table based on the one or more notch filter configurations, the pseudorandom noise code and the doppler frequency.

23. The apparatus of claim 22 further comprising means for receiving assistance data from a network entity, wherein the assistance data includes the look-up-table.

24. The apparatus of claim 23 wherein the assistance data is received via one or more Long Term Evolution Positioning Protocol (LPP) messages.

25. The apparatus of claim 23 wherein the assistance data is received via one or more Radio Resource Control (RRC) messages.

26. The apparatus of claim 22 wherein the means for determining the codephase correction value includes means for obtaining the codephase correction value based on an interpolation function.

27. The apparatus of claim 21 further comprising means for generating a look-up-table based on modeled auto-correlation functions for a plurality of notch filter configurations, and wherein the means determining the codephase correction value includes means for obtaining the codephase correction value from the look-up-table based on the one or more notch filter configurations, the pseudorandom noise code and the doppler frequency.

28. The apparatus of claim 21 wherein the one or more notch filter configurations include one or more notch frequencies and one or more bandwidths associated with the one or more notch frequencies.

29. The apparatus of claim 21 wherein the means for computing the range to the satellite vehicle includes means for determining a pseudorange to the satellite vehicle based on the signal.

30. The apparatus of claim 21 further comprising one or more notch filters consisting of one or more digital filters with programmable center frequencies and bandwidths.

31. A non-transitory processor-readable storage medium comprising processor-readable instructions to cause one or more processors to determine a range to a satellite vehicle, comprising:
  code for receiving a signal from the satellite vehicle;
  code for determining one or more notch filter configurations;
  code for determining a pseudorandom noise code and a doppler frequency associated with the signal;
  code for determining a codephase correction value based at least on the one or more notch filter configurations, the pseudorandom noise code and the doppler frequency; and
  code for computing the range to the satellite vehicle based at least in part on the signal and the codephase correction value.

32. The non-transitory processor-readable storage medium of claim 31 wherein the code for determining the codephase correction value includes code for obtaining the codephase correction value from a look-up-table based on the one or more notch filter configurations, the pseudorandom noise code and the doppler frequency.

33. The non-transitory processor-readable storage medium of claim 32 further comprising code for receiving assistance data from a network entity, wherein the assistance data includes the look-up-table.

34. The non-transitory processor-readable storage medium of claim 33 wherein the assistance data is received via one or more Long Term Evolution Positioning Protocol (LPP) messages.

35. The non-transitory processor-readable storage medium of claim 33 wherein the assistance data is received via one or more Radio Resource Control (RRC) messages.

36. The non-transitory processor-readable storage medium of claim 32 wherein the code for determining the codephase correction value includes code for obtaining the codephase correction value based on an interpolation function.

37. The non-transitory processor-readable storage medium of claim 31 further comprising code for generating a look-up-table based on modeled auto-correlation functions for a plurality of notch filter configurations, and wherein the code determining the codephase correction value includes code for obtaining the codephase correction value from the look-up-table based on the one or more notch filter configurations, the pseudorandom noise code and the doppler frequency.

38. The non-transitory processor-readable storage medium of claim 31 wherein the one or more notch filter configurations include one or more notch frequencies and one or more bandwidths associated with the one or more notch frequencies.

39. The non-transitory processor-readable storage medium of claim 31 wherein the code for computing the range to the satellite vehicle includes code for determining a pseudorange to the satellite vehicle based on the signal.

40. The non-transitory processor-readable storage medium of claim 31 further comprising one or more notch filters consisting of one or more digital filters with programmable center frequencies and bandwidths.

\* \* \* \* \*